United States Patent [19]
Scott

[11] 4,256,538
[45] Mar. 17, 1981

[54] LIQUID METAL COOLED FAST BREEDER NUCLEAR REACTOR

[75] Inventor: Donald Scott, Hartford, England

[73] Assignee: Nuclear Power Company Limited, England

[21] Appl. No.: 972,866

[22] Filed: Dec. 26, 1978

[30] Foreign Application Priority Data

Jan. 16, 1978 [GB] United Kingdom ............... 1659/78

[51] Int. Cl.³ .................................................. G21C 15/00
[52] U.S. Cl. .................................. 176/40; 176/50; 176/62
[58] Field of Search ....................... 176/40, 50, 62, 63

[56] References Cited

U.S. PATENT DOCUMENTS

| | | | |
|---|---|---|---|
| 3,212,978 | 10/1965 | Short et al. ................. | 176/50 X |
| 3,784,443 | 1/1974 | Vercasson .................... | 176/63 |
| 4,036,688 | 7/1972 | Bolden et al. ............... | 176/62 X |
| 4,045,286 | 8/1977 | Blum et al. .................. | 176/62 X |
| 4,053,359 | 10/1977 | Pennell ........................ | 176/50 X |
| 4,172,010 | 10/1979 | Seed et al. ................... | 176/40 X |
| 4,172,011 | 10/1979 | Seed et al. ................... | 176/40 X |

Primary Examiner—Peter A. Nelson
Attorney, Agent, or Firm—Larson, Taylor and Hinds

[57] ABSTRACT

A liquid metal cooled fast breeder nuclear reactor comprising a fuel assembly supported on a diagrid and submerged in a pool of liquid metal coolant within a containment vessel. The diagrid is of triple component construction comprising a short cylindrical plenum mounted on a conical undershell and loosely embraced by a fuel store carrier. The plenum merely distributes coolant through the fuel assembly the load of the assembly being carried by the undershell by means of struts which penetrate the plenum. The fuel assembly, fuel store carrier and undershell provide secondary containment for the plenum.

6 Claims, 6 Drawing Figures

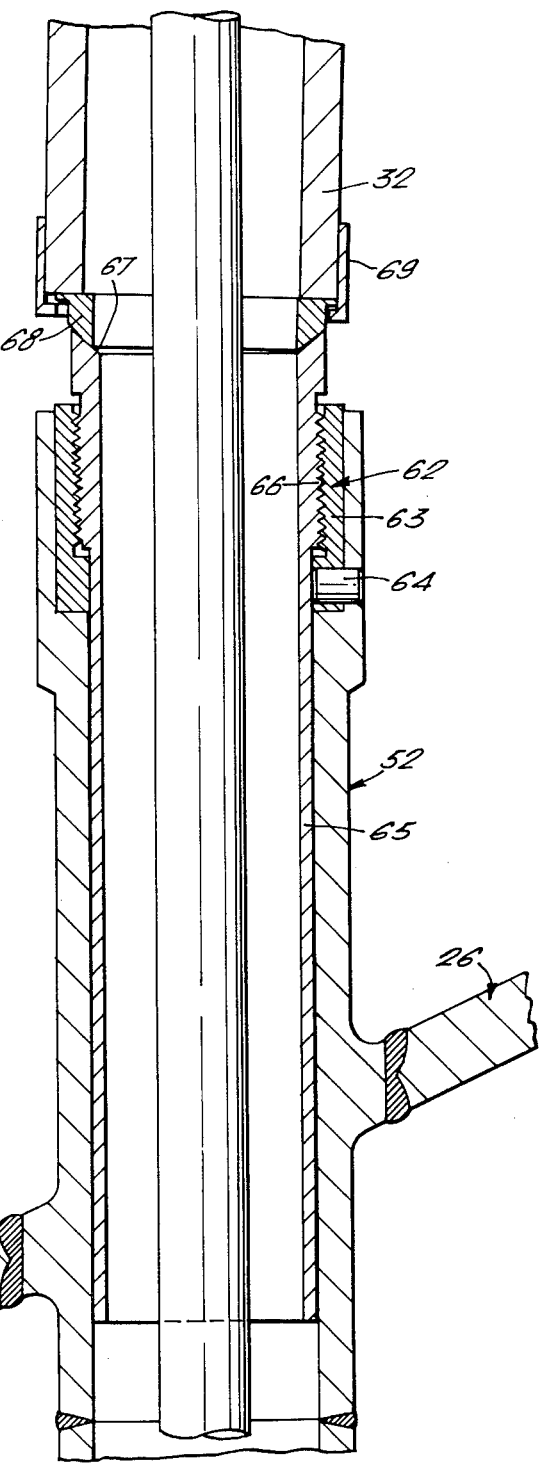

LIQUID METAL COOLED FAST BREEDER NUCLEAR REACTOR

BACKGROUND OF THE INVENTION

This invention relates to liquid metal cooled fast breeder nuclear reactors.

In a liquid metal cooled fast breeder nuclear reactor the fuel assembly, and sometimes a fuel store for irradiated and new fuel, is supported on a diagrid in a containing vessel and the diagrid serves as a plenum for distributing coolant throughout the fuel assembly. Because of the weight of the fuel assembly, several hundred tonnes, it is necessary to provide strengthening structure such as webs in the plenum but such strengthening structure besides making manufacture of the diagrid more complicated, also sets up complex stresses in the plenum which could give rise to a breach with consequent loss of coolant. As a protection against such an emergency it has been proposed to make the plenum of double containment construction whereby in the event of failure of the first containment the second containment, which need not necessarily be leak tight, will contain the pressure long enough for an orderly shut down of the reactor to be effected. Double containment construction leads to greater complexity and it is an object of the invention to provide an improved liquid metal cooled fast breeder nuclear reactor having a diagrid of simplified construction which thereby reduces the risk of failure due to complex stresses but at the same time provides a secondary containment for reducing the rate of leakage from a breached first containment.

SUMMARY OF THE INVENTION

According to the invention a liquid metal cooled fast breeder nuclear reactor comprises a fuel assembly supported on a diagrid and submerged in a pool of liquid metal coolant within a containment vessel wherein the diagrid comprises, in combination, a short, upright, generally cylindrical plenum for containing fluid pressure, a load supporting undershell on which the plenum is mounted and a fuel store carrier loosely embracing the plenum, the combination being supported at a peripheral flange of the undershell. The function of the plenum is mainly for containing fluid pressure and distributing coolant throughout the fuel assembly whilst the function of the undershell is to support the load of the fuel assembly, the load being transmitted through the plenum and supported at a fuel assembly containing vessel by the peripheral flange of the undershell. The fuel store carrier transmits the load of a fuel store to the containing vessel through the peripheral flange of the undershell and is spaced from the plenum so that no load is transmitted from it to the plenum. The undershell and fuel store carrier provide a secondary containment for the underside and the periphery, respectively, of the plenum whilst the fuel assembly mounted adjacent the upper face of the plenum provides a secondary containment for the upper side of the plenum. In the event of a breach of the plenum, although the undershell and fuel store carrier are not necessarily leak tight, leakage of coolant from the plenum is restricted sufficiently to enable an orderly shut down of the reactor to be made before the fuel assembly becomes overheated. Thus secondary containment is inherent in the diagrid and the diagrid fails safe.

DESCRIPTION OF THE DRAWINGS

Constructions of liquid metal cooled fast breeder nuclear reactor embodying the invention are described, by way of example, with reference to the accompanying drawings wherein, FIG. 6 is a fragmentary sectional view showing a detail shown in FIG. 5.

DESCRIPTION OF THE PREFERRED EMBODIMENT

Figure 1:
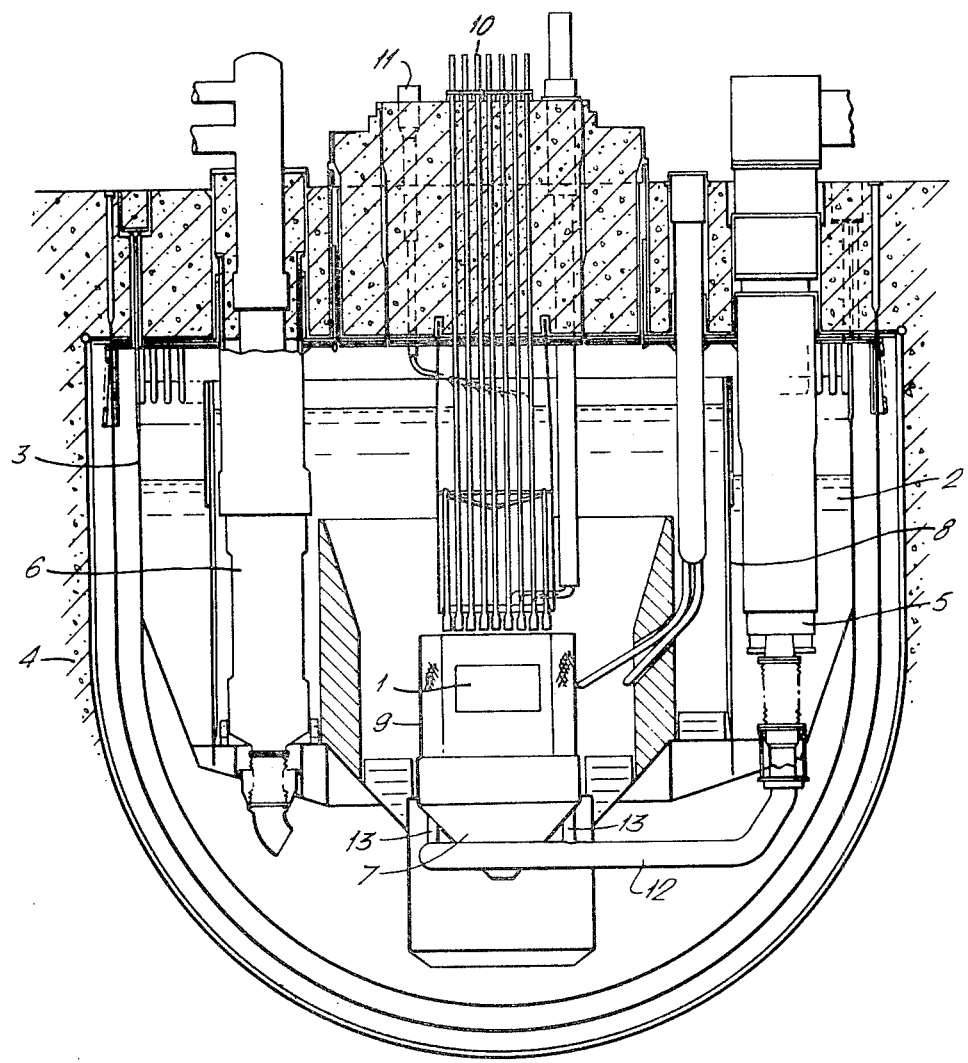
FIG. 1 is a diagrammatic side view in section of a nuclear reactor.
Figure 2:
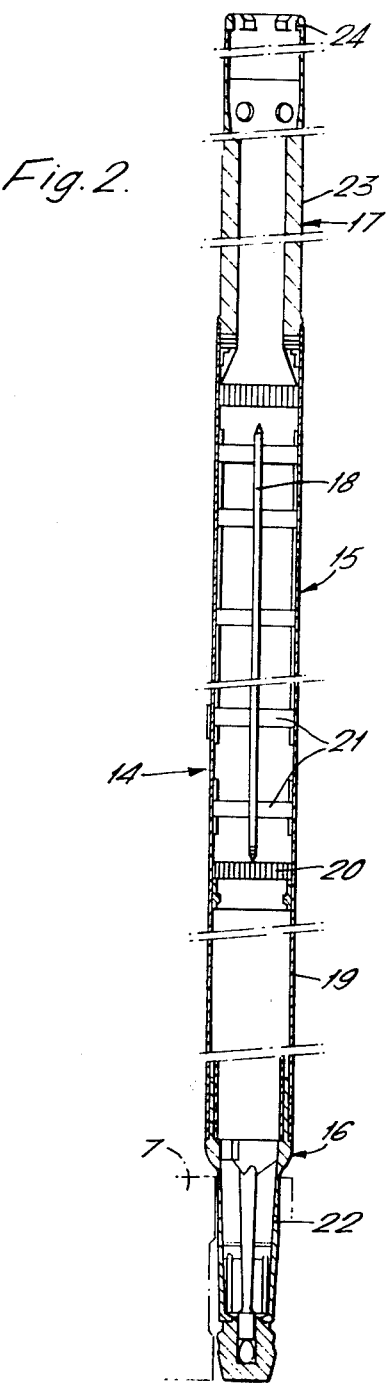
FIG. 2 is a side view of a fuel sub-assembly drawn to a larger scale.

FIG. 1 illustrates a liquid metal cooled fast breeder nuclear reactor having a fuel assembly 1 submerged in a pool 2 of liquid sodium coolant in a primary vessel 3. The primary vessel is suspended from the roof of a containment vault 4 and there is provided a plurality of coolant pumps 5 and heat exchangers 6 only one of each of pumps and heat exchangers being shown. The fuel assembly 1 supported on a diagrid 7 is housed with the heat exchangers in a core tank 8 whilst the pumps 5, which deliver coolant to the diagrid, are disposed outside of the core tank. The core or fuel assembly 1 comprises a plurality of sub-assemblies which upstand from the diagrid in closely spaced side-by-side array and the fuel assembly is embraced by a core restraining barrel 9 to provide peripheral restraint. Control rods 10 and instrumentation 11 penetrate the roof of the vault and a ring main 12 having six vertical risers 13 delivers coolant from the pumps 5 to the diagrid 7. The sub-assemblies designated 14 in FIG. 2 each comprise a central fuel section 15, a lower end locating section 16 and an upper end neutron shielding section 17. The fuel section comprises a bundle of elongate fuel pins 18 enclosed within a tubular wrapper 19 of hexagonal cross-section. The pins are supported within the wrapper at their lower ends by a grid 20, and are braced intermediate their lengths by cellular grids 21 of honeycomb form. The lower end locating section 16 has a spike 22 which is arranged to plug into a socket associated with the diagrid 7 whilst the upper end neutron shielding section 17 comprises a massive steel tube 33 having a lifting head 24.

Figure 3:
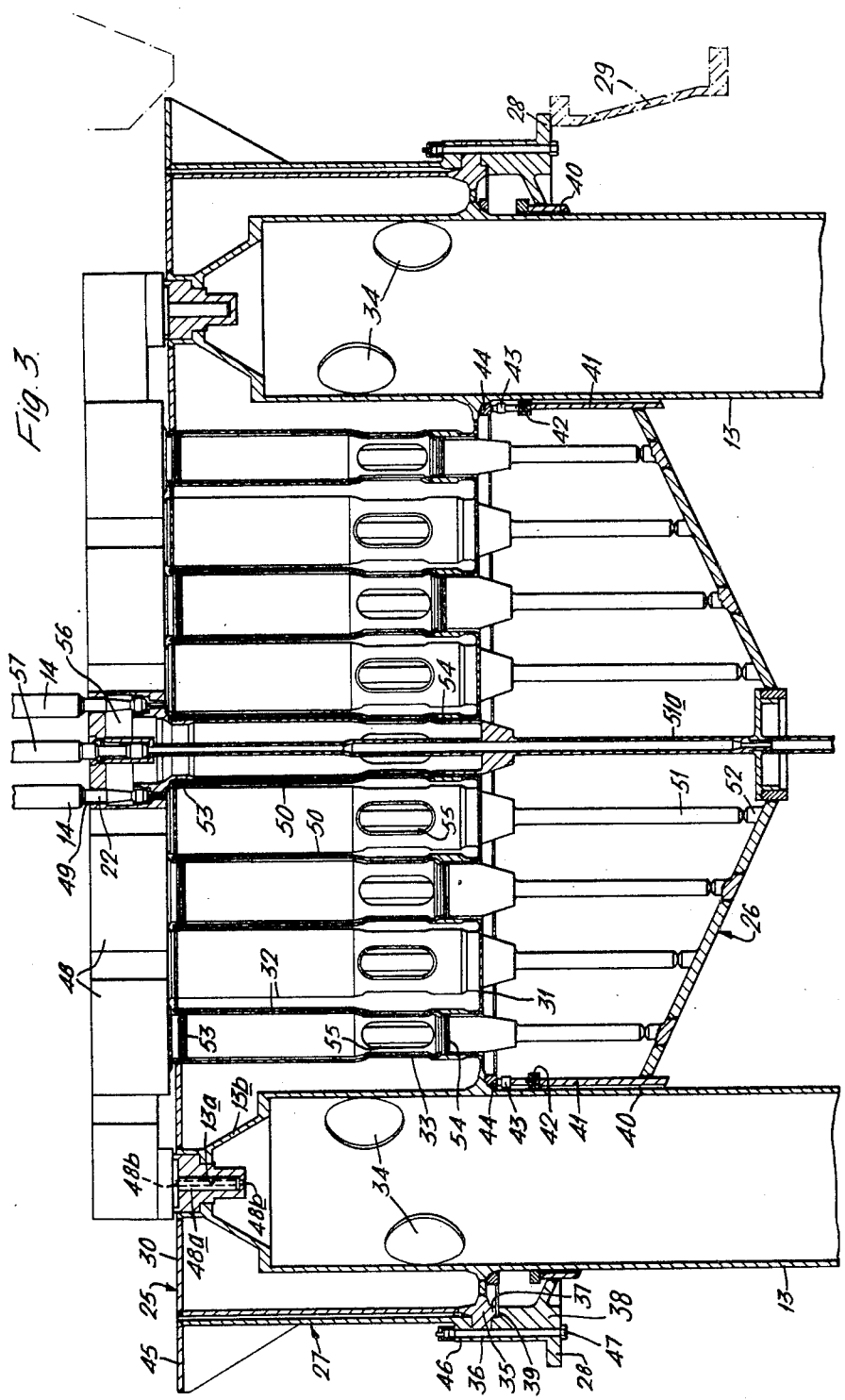
FIG. 3 is a side view in section of a fuel assembly supporting diagrid drawn to a smaller scale than that of FIG. 2.
Figure 4:
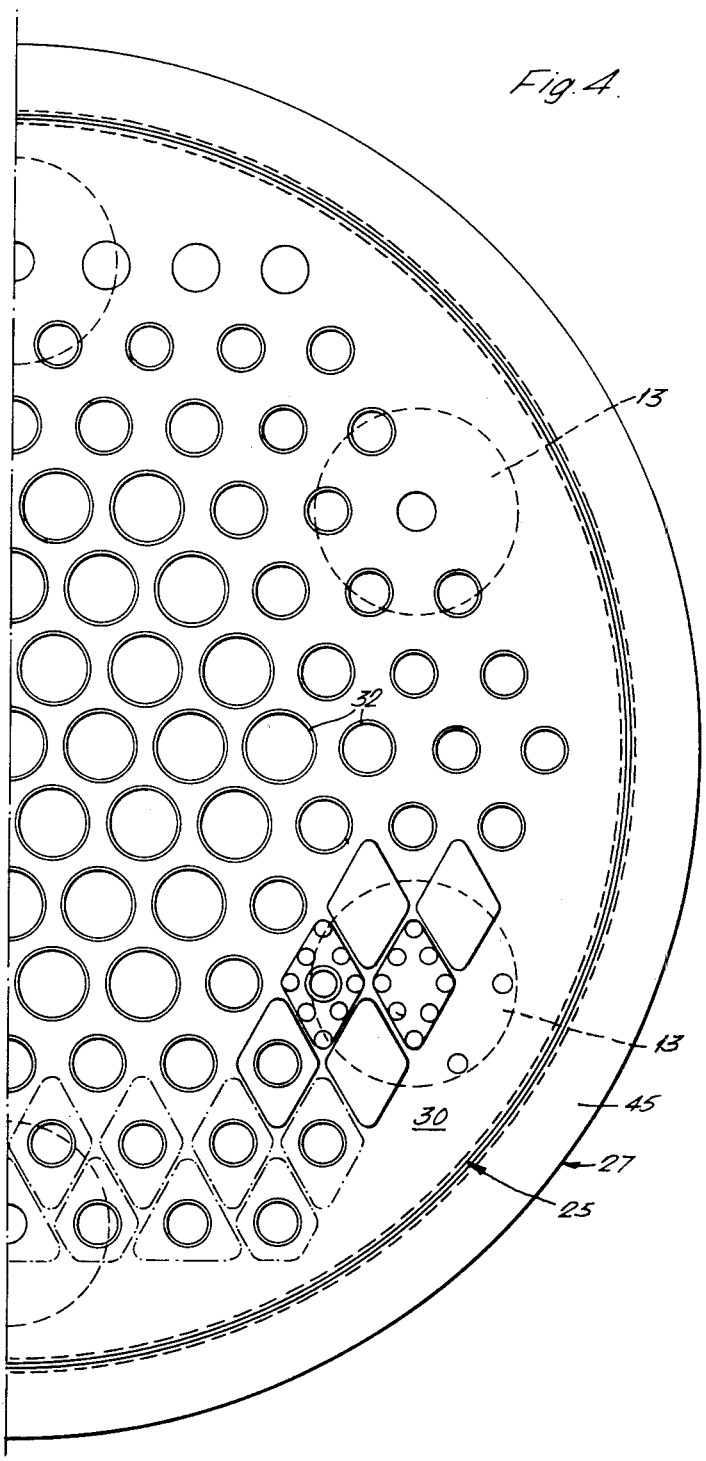
FIG. 4 is a half plan view of the diagrid shown in FIG. 3.

The diagrid 7 is of triple component construction as shown in FIGS. 3 and 4 comprising a plenum 25 for containing fluid pressure, a load supporting undershell 26 and a fuel store carrier 27. The combination of components 25, 26, 27 is supported from a peripheral flange 28 of the undershell which abuts a support stool 29 shown in broken line in FIG. 3. The plenum is of short cylindrical form having upper and lower planar faces 30, 31 respectively which are tied together by tubular members 32 having side openings 33 to be described hereinafter. The risers 13 sealingly penetrate the lower face 31 of the plenum and discharge through side apertures 34 into the plenum. The lower planar face 31 of the plenum has a reinforcing ring 35 which carries a flange 36 and defines an annular spigot 37.

The undershell 26 is of inverted cone form reinforced at its rim by a ring 38 which carries the support flange 28. The ring 38 defines a socket 39 which is complementary to the spigot 37 formed at the periphery of the lower face 31 of the plenum. The risers 13 penetrate the undershell through apertures 40 which have reinforcing rings 41. The reinforcing rings each have a flange 42 from which the lower face 31 of the plenum is supported through a series of jacking screws 43 and a thrust ring 44.

The fuel store carrier 27 is of cylindrical form having an upper flange or platform 45 for carrying a store of irradiated and new fuel and has a lower flange 46. The reinforcing rings 35, 38 and the flange 46 are clamped together by bolts 47.

The fuel sub-assemblies 14 are arranged in groups each group supported by a carrier 48. The carriers 48 provide sockets 49 into which the spikes 22 are plugged and, with the exception of those carriers which coincide with the risers 13, the carriers each have a barrel 50 which extends through the tubular support members 32 of the plenum. The barrel 50 has a tail 51 which end abuts an abutment pad 52 on the undershell so that the load of the group of fuel sub-assemblies and the carrier is supported by the undershell. The barrels 50 are loose fitting in the tubular members 32 of the plenum so that substantially no load is transmitted to the plenum and the barrels 50 are sealed to the tubular members 32 by means of upper and lower pairs of expanding sealing rings 53, 54. The barrels 50 have side openings 55 which coincide with the side openings 33 of the tubular members 32 for coolant flow and the bores of the barrels 50 communicate with a manifold 56 which conducts coolant to each fuel sub-assembly of the relvant group. The carriers 48 which coincide with the risers 13 each have a spike 48a which plugs into a socket 13a in an end cover 13b of the associated riser and coolant is fed to the sub-assemblies supported by the relevant carrier by way of a duct 48b extending through the cover 13b and the spike 48a.

The central socket 49 of each carrier 48 houses a control rod assembly 57 which is generally of the same shape and proportions as the fuel sub-assemblies. The tail designated 51a of the central carrier is tubular and is connected directly to the undershell to provide access to the fuel assembly for an upwardly actuated shut down control rod.

In operation of the nuclear reactor liquid metal coolant is flowed from the pool 2 by means of the pump 5 to the plenum 25 by way of the ring main 12 and the risers 13. The coolant enters the plenum 25 through the apertures 34 and flows across the plenum through the side openings 33 in the tubular members 32 and the side openings 55 in the barrels 50, thence, through each fuel sub-assembly 14 by way of the spike 22, the bundle of fuel pins 18 in heat exchange therewith, and the neutron shielding section 17. The coolant then passes from the core tank 8 through the heat exchangers 6 in heat exchange with a secondary liquid metal coolant thence back to the pool 2.

The triple component diagrid construction separates the main functions of the diagrid so that complex stresses in the plenum are largely avoided. The plenum 25 is required only to contain the fluid pressure, the load of the fuel assembly being normally carried directly by the stiff conical undershell 26 and the load of the fuel store being transmitted directly to the diagrid support stool 29 by way of the fuel store carrier 27. As the coolant pressures at the upper face of the plenum and within the undershell are substantially equal no hold down means for the carriers 48 is required, the weight of the fuel sub-assemblies and carriers being sufficient. The undershell reinforcing ring 38 reduces the local bending stresses at the perimeter of the undershell and further reinforcement is provided by the reinforcing ring 35 of the plenum which is a tight fit in the reinforcing ring 38. Thus the plenum 25 and undershell 26 mutually support each other; dilation of the plenum due to fluid pressure is countered by radial contraction of the conical undershell due to the weight of the core. The undershell is isolated from pipe loads caused by thermal expansion and flow induced vibration because the risers 13 pass through the undershell by means of clearance apertures 40. Weakness of the undershell due to the apertures 40 is compensated for by the reinforcing rings 41 and because the undershell is accessible from both sides during fabrication adequate welds can be achieved and satisfactorily inspected.

A further advantage resides in the triple component construction in that it provides an inherent secondary containment system. Since the plenum 25 is generally free of dead load stresses it is very unlikely that a breach under pressure could occur. However, in the event of a breach of the periphery or lower face of the plenum the close proximity of the fuel store carrier 27 and the undershell 26 which effectively enshroud the periphery and lower face prevent a rapid loss of pressure from the plenum, that is, leakage outflow is reduced thereby providing sufficient time for an orderly shut down of the reactor before the fuel assembly becomes starved of coolant. A breach of the upper face of the plenum is shrouded by the fuel assembly itself and the restricted leakage flow will provide a useful cooling effect for the fuel assembly. Although in normal use the primary function of the plenum is to contain fluid pressure, it is designed such that, in the event of failure of the load carrying undershell, the diagrid is capable of supporting the load of the fuel assembly until repairs can be effected.

Figure 5:
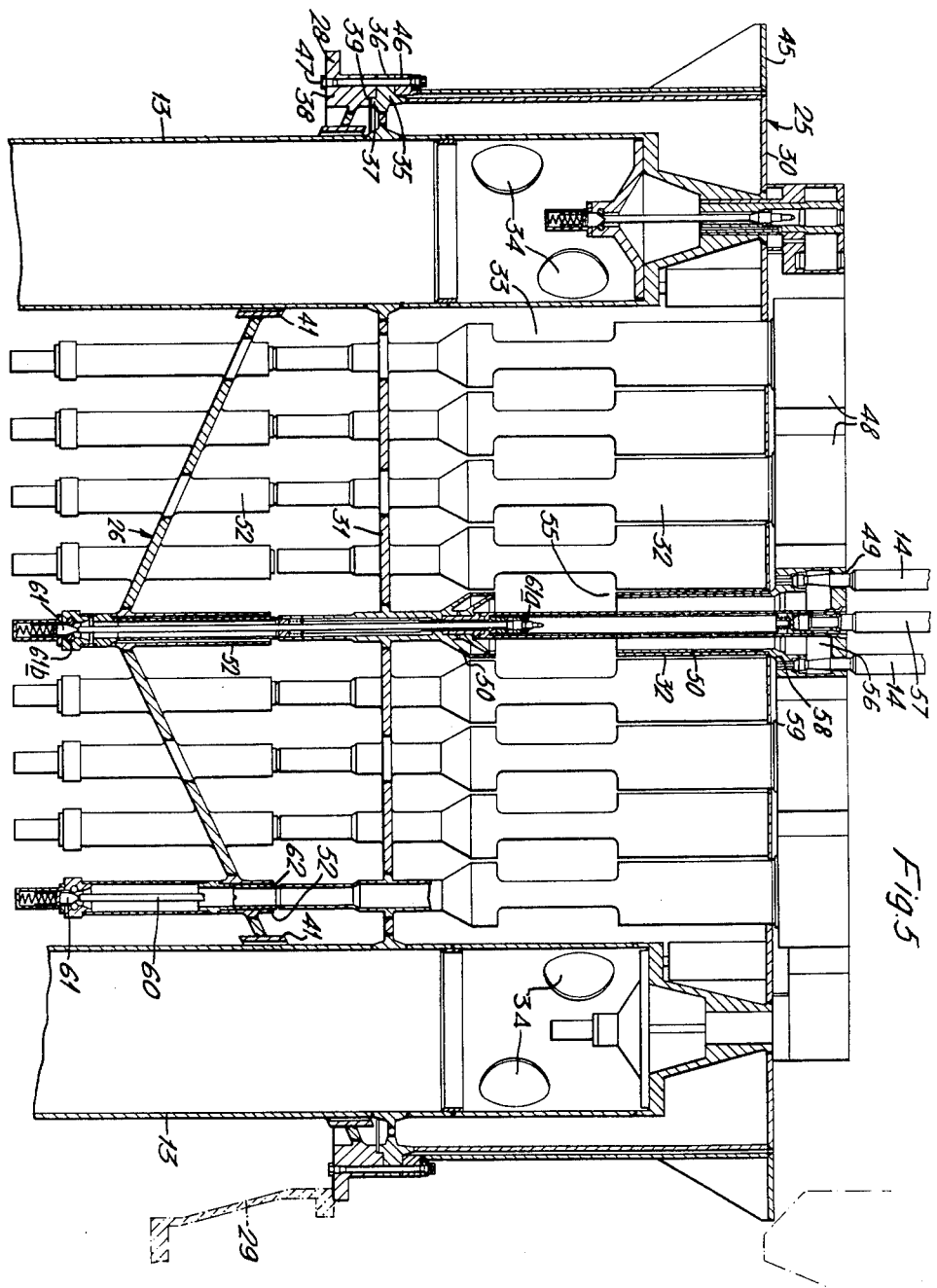
FIG. 5 is a side view in section of a fuel assembly supporting diagrid for an alternative construction of nuclear reactor.

In an alternative construction of liquid metal cooled fast breeder nuclear reactor generally similar to that shown in FIG. 1 the fuel assembly is free standing in which case the core restraining barrel 9 of the first described construction of nuclear reactor shown in FIG. 1 is omitted. In such a nuclear reactor having a free standing fuel assembly the fuel sub-assemblies of each group are arranged to lean inwardly of the group and on to a central fuel sub-assembly or control rod assembly. The carriers for the fuel sub-assemblies are therefore required to be held down to prevent pivoting and the arrangement of diagrid with carrier hold down means is shown in FIGS. 5 and 6.

The diagrid 7 is of triple component construction generally similar to that shown in FIGS. 3 and 4 but the carriers 48 have conical sealing faces 58 which sit on complementary seats 59 formed at the end of the tubular tie members 32. The barrels 50 of the carriers terminate within the tubular members 32 which themselves extend downwardly to the abutment pads 52 of the undershell. The carriers 48 are pulled down on to their seatings 59 by elastic bolts 60 having heads 61 which abut the outer face of the undershell and nuts 61a. Each head 61 abuts the outer face of the undershell through two parallel rollers 61b and the head has a pair of flat faces so that by turning the bolt through 90° the bolt head can pass between the rollers to enable the bolt to be withdrawn upwardly. So that the load of the fuel sub-assemblies and carriers 48 can be transmitted directly to the undershell through struts defined by the tubular members 32 and the abutment pads 52 it is necessary to have adjusting means 62 for the abutment faces of the tubular members and the abutment pads. The adjusting means 62 is shown in greater detail in FIG. 6. An abutment pad 52 comprises a tube upstanding from the undrshell and at its upper end it houses a screw threaded sleeve 63 which is locked to the abutment pad by a dowel 64. A jacking tube 65 having a complementary male screw thread 66 has a spherical facing 67 at its upper end and the facing 67 engages a complementary spherical facing member 68 slidably abutting the tubular member 32 of the plenum. The member 68 is slidably captivated by a sleeve 69 and seating of the complementary spherical facing 67, 68 is achieved by adjustment of the jacking tube 65. The arrangement of laterally sliding member 68 ensures alignment of the seating faces without inducement of shear stresses in the tubular member 32 or abutment pad 52. In this alternative construction the load of the fuel sub-assemblies and carriers which coincide with the risers is carried directly by the risers and support structure therefore instead of being transmitted to the undershell by jacking screws 43 as of the first described embodiment.

I claim:

1. In a liquid metal cooled fast breeder nuclear reactor of the kind wherein a fuel assembly is submerged in a pool of coolant and a short upright generally cylindrical plenum is disposed below the fuel assembly for distributing coolant flow therethrough, a fuel assembly support structure comprising an undershell disposed below the plenum to envelop the lower face thereof and a shroud member loosely embracing the periphery of the plenum, the combination of plenum, undershell and shroud member being supported at a peripheral flange of the undershell, and a plurality of strut members extending through said plenum to said undershell for distributing the load of the fuel assembly over the undershell.

2. A liquid metal cooled fast breeder nuclear reactor according to claim 1 wherein the undershell is generally of inverted cone form.

3. A liquid metal cooled fast breeder nuclear reactor according to claim 2 wherein the plenum has a peripheral spigot which engages a complementary socket in the peripheral flange of the undershell.

4. A liquid metal cooled fast breeder nuclear reactor according to claim 3 wherein the fuel assembly has carriers for fuel sub-assemblies and the carriers comprise said struts, said struts sealably extending through the plenum to abut at their lower ends with the load supporting undershell.

5. A liquid metal cooled fast breeder nuclear reactor according to claim 3 wherein the plenum is sealably penetrated by a plurality of tubular members which comprise said struts, said struts extending downwardly to abut the load supporting undershell, the fuel assembly being carried on the upper ends of the tubular members.

6. A liquid metal cooled fast breeder nuclear reactor according to claim 5 wherein the fuel assembly has carriers for fuel sub-assemblies and the carriers are retained in engagement with the tubular members by bolts extending upwardly from the underside of the undershell.

* * * * *